United States Patent
Maeda

(10) Patent No.: US 10,310,954 B2
(45) Date of Patent: Jun. 4, 2019

(54) CONTROL DEVICE AND METHOD FOR CONTROLLING STORAGE DEVICES

(71) Applicant: FUJITSU LIMITED, Kawasaki-shi, Kanagawa (JP)

(72) Inventor: Mihoko Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 427 days.

(21) Appl. No.: 14/714,628

(22) Filed: May 18, 2015

(65) Prior Publication Data

US 2015/0363273 A1   Dec. 17, 2015

(30) Foreign Application Priority Data

Jun. 16, 2014 (JP) .................................. 2014-123328

(51) Int. Cl.
G06F 11/20 (2006.01)
G06F 11/14 (2006.01)

(52) U.S. Cl.
CPC ...... *G06F 11/2071* (2013.01); *G06F 11/1415* (2013.01); *G06F 11/2069* (2013.01); *G06F 11/2089* (2013.01)

(58) Field of Classification Search
CPC ..... G06F 3/0646; G06F 3/065; G06F 11/2069
See application file for complete search history.

(56) References Cited

U.S. PATENT DOCUMENTS

| | | | | |
|---|---|---|---|---|
| 7,272,693 B2 * | 9/2007 | Ushijima | ............ | G06F 11/1448 707/999.202 |
| 8,438,277 B1 * | 5/2013 | Chepuri | ................ | G06F 3/0617 707/640 |
| 9,405,815 B1 * | 8/2016 | Wei | ................... | G06F 17/30578 |
| 9,639,277 B2 * | 5/2017 | Nakajima | ............... | G06F 3/061 |
| 2003/0131278 A1 | 7/2003 | Fujibayashi | | |
| 2007/0006020 A1 * | 1/2007 | Fujita | ................... | G06F 3/0613 714/6.11 |
| 2009/0327631 A1 * | 12/2009 | Yamada | .................. | G06F 3/061 711/162 |
| 2010/0049916 A1 * | 2/2010 | Nakajima | ............. | G06F 3/0611 711/114 |

(Continued)

FOREIGN PATENT DOCUMENTS

| | | |
|---|---|---|
| JP | 2002-108571 | 4/2002 |
| JP | 2003-242011 | 8/2003 |
| JP | 2005-242747 | 9/2005 |

*Primary Examiner* — Robert W Beausoliel, Jr.
*Assistant Examiner* — Nirav K Khakhar
(74) *Attorney, Agent, or Firm* — Staas & Halsey LLP

(57) ABSTRACT

A control device includes a processor configured to copy a part of data stored in a first volume to a second volume, copy whole data stored in the first volume to a destination volume, and receive a request to read first data stored in the second volume. The processor is configured to read the first data from the second volume when the first data has been partially copied to the second volume. The processor is configured to read, when the first data has not been partially copied to the second volume, the first data from the first volume on basis of association information associating the first volume with the second volume. The processor is configured to identify, upon failing to read the first data from the first volume, the equivalent volume on basis of recovery information related to the destination volume as an equivalent volume of the first volume.

9 Claims, 7 Drawing Sheets

| SESSION ID | COPY SOURCE VOLUME | COPY DESTINATION VOLUME | COPY TYPE | STATUS | RECOVERY SESSION |
|---|---|---|---|---|---|
| 0 | 1 | 2 | SnapOPC | ERROR | 1 |
| 1 | 1 | 3 | EC | ERROR | — |

(56) References Cited

U.S. PATENT DOCUMENTS

| | | | |
|---|---|---|---|
| 2011/0276754 A1* | 11/2011 | Bish | G06F 3/0611 |
| | | | 711/111 |
| 2013/0212345 A1* | 8/2013 | Nakajima | G06F 3/0605 |
| | | | 711/161 |
| 2014/0173017 A1* | 6/2014 | Takagi | H04L 67/06 |
| | | | 709/213 |
| 2015/0309745 A1* | 10/2015 | Wilkinson | G06F 3/065 |
| | | | 711/162 |

* cited by examiner

| SESSION ID | COPY SOURCE VOLUME | COPY DESTINATION VOLUME | COPY TYPE | STATUS | RECOVERY SESSION |
|---|---|---|---|---|---|
| 0 | 1 | 2 | SnapOPC | ACTIVE | 1, x, ... |
| 1 | 1 | 3 | EC | ACTIVE | — |

| SESSION ID | COPY SOURCE VOLUME | COPY DESTINATION VOLUME | COPY TYPE | STATUS | RECOVERY SESSION |
|---|---|---|---|---|---|
| 0 | 1 | 2 | SnapOPC | ERROR | 1 |
| 1 | 1 | 3 | EC | ERROR | — |

CONTROL DEVICE AND METHOD FOR CONTROLLING STORAGE DEVICES

CROSS-REFERENCE TO RELATED APPLICATION

This application is based upon and claims the benefit of priority of the prior Japanese Patent Application No. 2014-123328, filed on Jun. 16, 2014, the entire contents of which are incorporated herein by reference.

FIELD

The embodiment discussed herein is related to a control device and a method for controlling storage devices.

BACKGROUND

For a storage device including a plurality of volumes, a technique for improving redundancy of data by duplicating (copying) data stored in a volume (referred to as an operation volume or a copy source volume) to another volume (referred to as a copy destination volume) is widely used. In addition, there is a remote copy technique for duplicating data stored in a volume of a storage device among a plurality of remotely arranged storage devices to a volume of another storage device among the plurality of remotely arranged storage devices.

As such a copy technique, there is a method called equivalent copy (also called full copy) for generating a complete duplicate of an operation volume in a copy destination volume. As the equivalent copy, there are Equivalent Copy (EC) in which a copy source and a copy destination are arranged in the same housing and Remote Equivalent Copy (REC) in which a copy source and a copy destination are arranged in separate housings.

An advanced copy function is supported in some storage devices.

The advanced copy function is a function of causing a storage device to generate a copy by itself at a high speed without using a central processing unit (CPU) of a host device. The advanced copy function copies data stored in a copy source volume at a certain time point to another volume in a short time.

The advanced copy function includes methods such as EC for generating a duplicate synchronized with update of a copy source volume and One Point Copy (OPC) for generating a duplicate of an overall copy source volume at an arbitrary time point. As OPC, there are QuickOPC, SnapOPC, and the like.

QuickOPC is a method in which whole data stored in a copy source volume is first copied to a copy destination volume and thereafter only updated data (differential data) is copied to the copy destination volume. SnapOPC is a method using Copy-on-Write in which only data to be updated is duplicated to a copy destination volume when data stored in a copy source volume is updated. QuickOPC and SnapOPC may reduce physical capacities of duplicated volumes, compared with full backup.

Related techniques are disclosed in, for example, Japanese Laid-open Patent Publication No. 2002-108571, Japanese Laid-open Patent Publication No. 2003-242011, and Japanese Laid-open Patent Publication No. 2005-242747.

As described above, a volume (SnapOPC duplicated volume (SDV)) duplicated by SnapOPC does not hold whole data stored in an operation volume that is a copy source. Thus, if a hardware failure such as a disk double failure occurs in the operation volume, data stored in the SDV is not useful for recovery of the operation volume.

Thus, in order to prepare against a hardware failure of the operation volume, an equivalent copy (equivalent volume) that is a backup of the overall operation volume is to be generated by EC or REC in addition to SnapOPC.

However, data held in the equivalent volume generated by fully copying the operation volume is data at a time point when EC is started. Thus, if SnapOPC is started after EC is performed, and if a hardware failure of the operation volume occurs, data stored in the operation volume at a time point when SnapOPC is started is not restored.

In order to restore the data stored in the operation volume at the time point of the start of SnapOPC, a method is considered in which an equivalent copy of the operation volume is generated every time SnapOPC is performed. However, if an equivalent volume is generated every time SnapOPC is performed, a large amount of disk capacity is consumed and the cost of an overall storage device increases.

SUMMARY

According to an aspect of the present invention, provided is a control device including a processor. The processor is configured to perform a partial copy process of copying a part of data stored in a first volume arranged in a first storage device to a second volume. The processor is configured to perform an equivalent copy process of copying whole data stored in the first volume to a destination volume. The processor is configured to store management information including association information and recovery information. The association information associates the first volume as a copy source with the second volume as a copy destination in the partial copy process. The recovery information is related to the destination volume as an equivalent volume of the first volume. The processor is configured to receive a request to read first data stored in the second volume. The processor is configured to read the first data from the second volume when the first data has been partially copied to the second volume. The processor is configured to read the first data from the first volume on basis of the association information when the first data has not been partially copied to the second volume. The processor is configured to identify the equivalent volume on basis of the recovery information upon failing to read the first data from the first volume.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
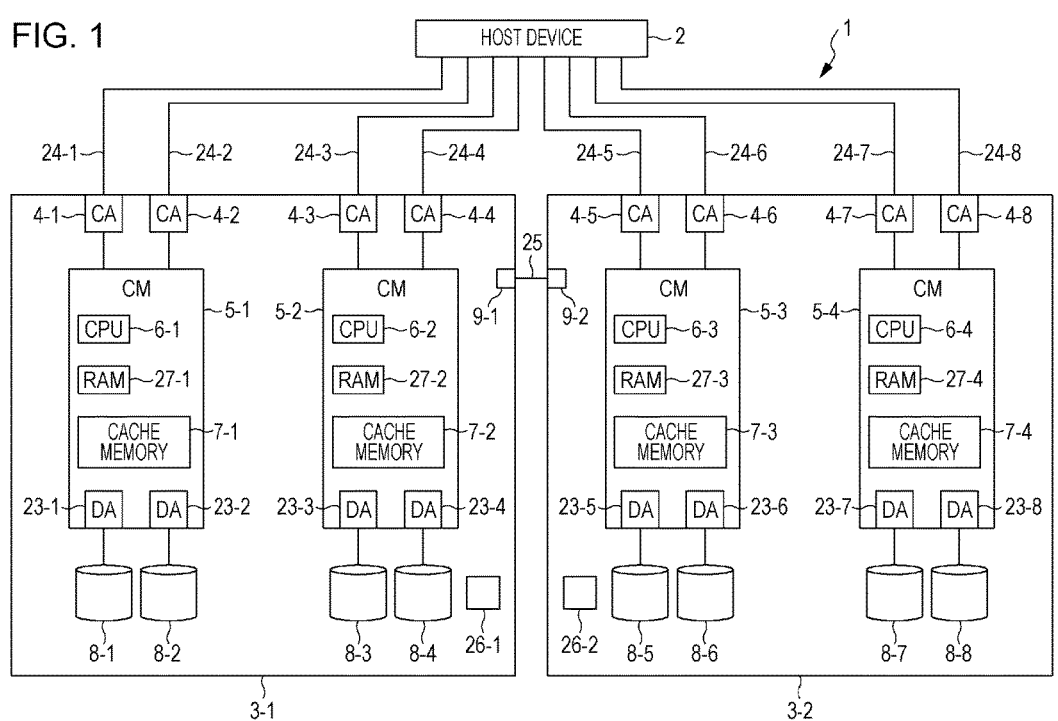
FIG. 1 is a diagram illustrating an exemplary hardware configuration of a storage system according to an embodiment.

Hereinafter, an embodiment is described with reference to the accompanying drawings. The following embodiment, however, is merely an example and does not intend to exclude various modifications and techniques that are not clarified in the embodiment. The embodiment may be variously modified without departing from the gist of the embodiment. The drawings do not indicate that only constituent elements illustrated in the drawings are provided and the drawings indicate that other functions and the like may be included.

First, with reference to FIGS. 1 to 8, an exemplary configuration of a storage system 1 according to the embodiment is described below.

FIG. 1 is a diagram illustrating an exemplary hardware configuration of the storage system 1 according to the embodiment.

In the storage system 1 according to the embodiment, multiple storage devices (two storage devices 3-1 and 3-2 are depicted in the example illustrated in FIG. 1) are communicably connected with each other through inter-housing communication 25. The storage devices 3-1 and 3-2 are also referred to as housings 3-1 and 3-2.

A host device 2 is an information processing device and is, for example, a computer that includes a CPU, a hard disk drive (HDD), a random access memory (RAM), and a read-only memory (ROM) that are not illustrated.

The host device 2 writes and reads data (user data) in and from logical volumes (hereinafter referred to as volumes) arranged in the storage devices 3-1 and 3-2 in response to an operation of a user who uses a terminal device (not illustrated). For example, the host device 2 issues data access requests to read or write data from or in the volumes of the storage devices 3-1 and 3-2. The storage devices 3-1 and 3-2 access the data stored in the volumes in response to the data access requests and respond to the host device 2.

The storage devices 3-1 and 3-2 provide storage regions to the host device 2 and are, for example, redundant array of inexpensive disks (RAID) devices.

In the embodiment, data stored in volumes of the storage devices 3-1 and 3-2 is backed up to other volumes by SnapOPC, while data stored in overall volumes of the storage devices 3-1 and 3-2 is equivalently copied to other volumes by EC or REC. Hereinafter, EC and REC are also collectively referred to as "EC/REC".

Hereinafter, a volume from which data is copied is referred to as a copy source volume or an operation volume. A volume to which data stored in the operation volume is copied by a SnapOPC session is referred to as an SDV. A volume to which data stored in the operation volume is copied by an EC/REC session is referred to as an equivalent volume.

The storage device 3-1 includes controller modules (CMs) 5-1 and 5-2 (control devices) and a temporary storage region 26-1.

The CMs 5-1 and 5-2 are controllers configured to perform various types of control in the storage device 3-1. The CMs 5-1 and 5-2 perform various types of control such as control of access to disk devices 8-1 to 8-4 (described later) in accordance with storage access requests (access control signals) received from the host device 2 that is a higher-level device.

The CMs 5-1 and 5-2 are made redundant in the storage device 3-1. The CM 5-1 operates as a master CM configured to manage operations of the overall storage device 3-1, while the CM 5-2 operates as a slave CM that operates under control of the master CM 5-1. The slave CM 5-2 takes over functions of the CM 5-1 and operates as a master CM upon a failure of the master CM 5-1.

The CM 5-1 is connected to the host device 2 via channel adaptors (CAs) 4-1 and 4-2 through paths 24-1 and 24-2 compliant with various communication standards such as fibre channel (FC), internet small computer system interface (iSCSI), serial-attached SCSI (SAS), fibre channel over Ethernet (FCoE), and InfiniBand.

The CM 5-2 is connected to the host device 2 via CAs 4-3 and 4-4 through paths 24-3 and 24-4 compliant with various communication standards such as FC, iSCSI, SAS, FCoE, and InfiniBand.

The CAs 4-1 and 4-2 are modules that connect the host device 2 to the CM 5-1, while the CAs 4-3 and 4-4 are modules that connect the host device 2 to the CM 5-2. The CAs 4-1 to 4-4 connect the host device 2 to the CMs 5-1 and 5-2 through the paths 24-1 to 24-4.

The temporary storage region 26-1 is used for the inter-housing communication between the CMs 5-1 and 5-2. For example, the temporary storage region 26-1 is a memory such as a RAM, for example. The temporary storage region 26-1 is used as a temporary buffer 22 that is described later.

The storage device 3-1 includes one or more disk devices 8-1 to 8-4. The disk devices 8-1 to 8-4 are HDDs, for example. In the storage device 3-1, storage regions of the disk devices 8-1 to 8-4 are assigned as volumes and used as an operation volume, an SDV, an equivalent volume, and the like.

The CM 5-1 includes a CPU 6-1, a RAM 27-1, a cache memory 7-1, and device adapters (DAs) 23-1 and 23-2, while the CM 5-2 includes a CPU 6-2, a RAM 27-2, a cache memory 7-2, and DAs 23-3 and 23-4.

The CPUs 6-1 and 6-2 are processing devices configured to perform various types of control and calculation in the CMs 5-1 and 5-2. The CPUs 6-1 and 6-2 read programs stored in an ROM (not illustrated) or the like and perform various processes by executing the programs. For example, known CPUs may be arranged as the CPUs 6-1 and 6-2.

In the embodiment, the CPU 6-1 of the master CM 5-1 functions as a copy controller 11 (described later with reference to FIG. 2) by executing a control program for controlling the storage devices.

The RAMs 27-1 and 27-2 store various types of data that is used by the CMs 5-1 and 5-2, respectively, to perform processes, for example. In the embodiment, the RAMs 27-1 and 27-2 function as storage units configured to store a session management table 21 that is described later with reference to FIGS. 3 and 4. For example, known RAMs may be arranged as the RAMs 27-1 and 27-2.

The cache memories 7-1 and 7-2 are semiconductor memories configured to store user data and control data. The cache memories 7-1 and 7-2 are used for input/output (I/O) processes performed by the CMs 5-1 and 5-2 and are used for system control. For example, the cache memories 7-1 and 7-2 are used to temporarily hold data that is read or written from or in the disk devices 8-1 to 8-4 that are described later.

The DAs 23-1 and 23-2 are interfaces that are expanders, I/O controllers (IOCs), or the like and connect the CM 5-1 to the disk devices 8-1 to 8-4 by SAS, for example. The DAs 23-1 and 23-2 control communication of data between the CM 5-1 and the disk devices 8-1 and 8-2.

The DAs 23-3 and 23-4 are interfaces that are expanders, IOCs, or the like and connect the CM 5-2 to the disk devices 8-3 and 8-4 by SAS, for example. The DAs 23-3 and 23-4 control communication of data between the CM 5-2 and the disk devices 8-3 and 8-4.

A configuration and functions of the storage device 3-2 are similar to the configuration and functions of the aforementioned storage device 3-1, thus a description thereof is omitted.

In the storage device 3-2, the CMs 5-3 and 5-4 are made redundant, the CM 5-3 operates as a master CM configured to manage operations of the overall storage device 3-2, and the CM 5-4 operates as a slave CM that operates under control of the master CM 5-3. The slave CM 5-4 takes over functions of the CM 5-3 and operates as a master CM upon a failure of the master CM 5-3.

The storage devices 3-1 and 3-2 have remote adapters (RAs) 9-1 and 9-2, respectively.

The RAs 9-1 and 9-2 are interface controllers communicably connected with other storage devices through the inter-housing communication 25 and are, for example, FC adapters.

The inter-housing communication 25 is a communication line that connects the storage devices to each other, enables the storage devices to communicate data, and achieves data transfer on the basis of a standard such as FC, for example.

Hereinafter, when one of the plurality of storage devices is to be identified, a reference number "3-1" or "3-2" is used as a reference number representing the storage device. When an arbitrary storage device among the plurality of storage devices is to be referred to, a reference number "3" is used as a reference number representing the storage device.

Hereinafter, when one of the plurality of CAs is to be identified, any of reference numbers "4-1" to "4-8" is used as a reference number representing the CA. When an arbitrary CA among the plurality of CAs is to be referred to, a reference number "4" is used as a reference number representing the CA.

Hereinafter, when one of the plurality of CMs is to be identified, any of reference numbers "5-1" to "5-4" is used as a reference number representing the CM. When an arbitrary CM among the plurality of CMs is to be referred to, a reference number "5" is used as a reference number representing the CM.

Hereinafter, when one of the plurality of CPUs is to be identified, any of reference numbers "6-1" to "6-4" is used as a reference number representing the CPU. When an arbitrary CPU among the plurality of CPUs is to be referred to, a reference number "6" is used as a reference number representing the CPU.

Hereinafter, when one of the plurality of RAMs is to be identified, any of reference numbers "27-1" to "27-4" is used as a reference number representing the RAM. When an arbitrary RAM among the plurality of RAMs is to be referred to, a reference number "27" is used as a reference number representing the RAM.

Hereinafter, when one of the plurality of cache memories is to be identified, any of reference numbers "7-1" to "7-4" is used as a reference number representing the cache memory. When an arbitrary cache memory among the plurality of cache memories is to be referred to, a reference number "7" is used as a reference number representing the cache memory.

Hereinafter, when one of the plurality of disk devices is to be identified, any of reference numbers "8-1" to "8-8" is used as a reference number representing the disk device. When an arbitrary disk device among the plurality of disk devices is to be referred to, a reference number "8" is used as a reference number representing the disk device.

Hereinafter, when one of the plurality of DAs is to be identified, any of reference numbers "23-1" to "23-8" is used as a reference number representing the DA. When an arbitrary DA among the plurality of DAs is to be referred to, a reference number "23" is used as a reference number representing the DA.

Hereinafter, when one of the plurality of temporary storage regions is to be identified, any of reference numbers "26-1" and "26-2" is used as a reference number representing the temporary storage region. When an arbitrary temporary storage region among the plurality of temporary storage regions is to be referred to, a reference number "26" is used as a reference number representing the temporary storage region.

Figures 2, 3:
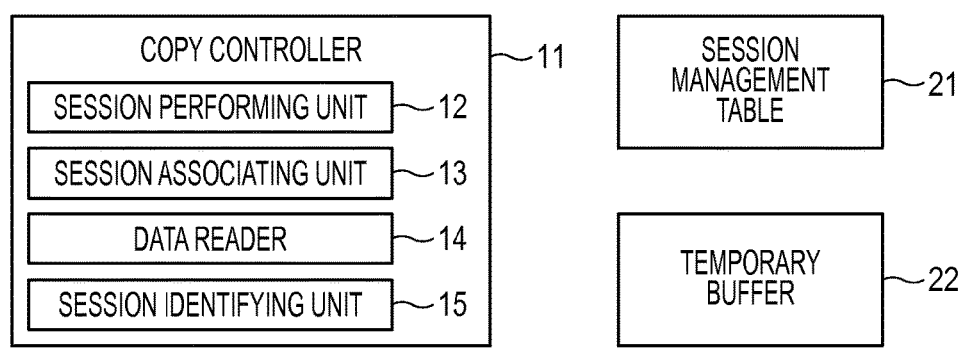
FIG. 2 is a diagram illustrating an exemplary functional configuration of a copy controller according to the embodiment.
FIG. 3 is a diagram illustrating an example of a session management table according to the embodiment.

FIG. 2 is a diagram illustrating an exemplary functional configuration of the copy controller 11 according to the embodiment.

The copy controller 11 performs various sessions such as a SnapOPC session and an EC/REC session in a storage device 3. If a hardware failure occurs in an operation volume of the storage device 3 and it is not possible to read data, the copy controller 11 reads the data stored in the operation volume from an equivalent volume of the operation volume.

The copy controller 11 includes a session performing unit (performing unit) 12, a session associating unit 13, a data reader (reader) 14, and a session identifying unit (identifying unit) 15.

The session performing unit 12 performs various sessions in the storage device 3. Specifically, the session performing unit 12 performs a SnapOPC session in the storage device 3 and generates an SDV 10-2 (refer to FIG. 5) that is a partial copy of an operation volume of the storage device 3. This process is also referred to as a partial copy process. In this case, the session performing unit 12 uses a copy bit map stored in a RAM 27 of a CM 5 to manage whether or not data stored in an operation volume 10-1 (refer to FIG. 5) is copied to the SDV by the SnapOPC session. A method for managing copied data using the copy bit map is known, thus illustration and description thereof are omitted.

The session performing unit 12 performs an EC session in the storage device 3 and copies whole data stored in the operation volume to an equivalent volume 10-3 (refer to FIG. 5) within the same storage device 3. Alternatively, the session performing unit 12 performs an REC session and copies whole data stored in the operation volume of the storage device 3 to an equivalent volume 10-4 (refer to FIG. 7) within another storage device 3. This process is also referred to as an equivalent copy process.

The session associating unit 13 links (associates) the SnapOPC session performed by the session performing unit 12 to (with) the EC/REC session and records information of the link (association) in a session management table 21 (management information) that is described later. The EC/REC session linked to the SnapOPC session is referred to as a recovery session. That is, the recovery session is an EC/REC session performed in order to save data that is stored in the operation volume 10-1 and is yet to be copied to the SDV 10-2 by the SnapOPC session.

Specifically, when the SnapOPC session is started by the session performing unit 12, the session associating unit 13 checks, based on the session management table 21 (described later), whether or not an EC session or REC session of which a copy source volume is the same as a copy source volume specified by the SnapOPC session has been previously performed. If such an EC or REC session is found, the session associating unit 13 registers the found EC or REC session as a recovery session of the SnapOPC session to be performed in a field of recovery session 216 (recovery information) within the session management table 21.

In addition, when an EC/REC session is started by the session performing unit 12, the session associating unit 13 checks, based on the session management table 21, whether or not a SnapOPC session of which a copy source volume is the same as a copy source volume specified by the EC/REC session has been previously performed. If such a SnapOPC session is found, the session associating unit 13 registers the EC or REC session to be performed as a recovery session of the found SnapOPC session in the field of recovery session 216 within the session management table 21.

The aforementioned session association process performed by the session associating unit 13 is described later with reference to FIG. 9.

The session management table 21 is described below.

Figures 4, 5:
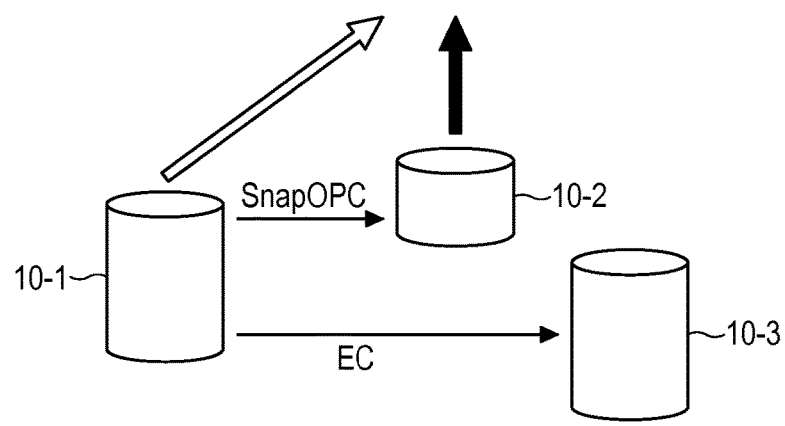
FIG. 4 is a diagram illustrating an example of the session management table according to the embodiment.
FIG. 5 is a diagram illustrating an example of a process of reading data in a normal state in the storage system according to the embodiment.

FIGS. 3 and 4 are diagrams illustrating examples of the session management table 21 according to the embodiment.

The session management table 21 is configured to store information (management information) on SnapOPC and EC/REC sessions (copy sessions) performed in the storage devices 3. The session management table 21 is stored in the RAMs 27 of the CMs 5, for example. The session management table 21 has fields of session identifier (ID) 211, copy source volume 212, copy destination volume 213, copy type 214, status 215, and recovery session 216 in association with each other.

The field of session ID 211 stores an ID uniquely identifying a copy session.

The field of copy source volume 212 stores a value (a volume number in the example illustrated in FIG. 3) identifying a copy source volume specified as a copy source of the copy session represented by the value of the session ID 211.

The field of copy destination volume 213 stores a value (a volume number in the example illustrated in FIG. 3) identifying a copy destination volume specified as a copy destination of the copy session represented by the value of the session ID 211. Association information that represents an association relationship between the copy source volume and the copy destination volume is formed by the value of the field of copy source volume 212 and the value of the field of copy destination volume 213.

The field of copy type 214 stores a value representing a copy type (indicating SnapOPC, EC, or REC) of the copy session represented by the value of the session ID 211.

The field of status 215 stores a value representing whether or not data stored in the copy source volume of the copy session represented by the value of the session ID 211 is able to be read. For example, if data stored in a copy source volume of a copy session is able to be read, a value of "Active" is stored in the field of status 215 of the session, as illustrated in the example of FIG. 3. On the other hand, if data stored in a copy source volume of a copy session is not able to be read, a value of "Error" is stored in the field of status 215 of the session, as illustrated in the example of FIG. 4.

The field of recovery session 216 stores a value representing an ID of a recovery session corresponding to the copy session represented by the value of the session ID 211. Values of multiple recovery sessions may be stored in the field of recovery session 216. The value of the field of recovery session 216 corresponds to the recovery information included in the management information.

The session management table 21 is stored in the RAM 27 of the CM 5 of the storage device 3, and the data in the session management table 21 is synchronized between the CMs 5, for example.

As illustrated in the example of FIG. 3, the session associating unit 13 may register, in the session management table 21, information on a plurality of recovery sessions for a single SnapOPC session.

The data reader 14 reads data stored in a volume of a storage device 3 in response to a request received from the host device 2.

FIG. 5 is a diagram illustrating an example of a process of reading data in a normal state in the storage system 1 according to the embodiment.

As illustrated in FIG. 5, when the host device 2 requests the data reader 14 to read data stored in the SDV 10-2, the data reader 14 references the copy bit map (not illustrated) stored in the CM 5 and determines whether or not the requested data is already copied to the SDV 10-2. If the requested data is already copied to the SDV 10-2, the data reader 14 reads the requested data from the SDV 10-2, as indicated by a black arrow. On the other hand, if the requested data is yet to be copied to the SDV 10-2, the data reader 14 reads the requested data from the copy source volume 10-1 (operation volume), as indicated by a white arrow.

However, if a hardware failure occurs in the copy source volume 10-1, the data reader 14 may not read, from the operation volume 10-1, the data that is yet to be copied to the SDV.

Figure 6:
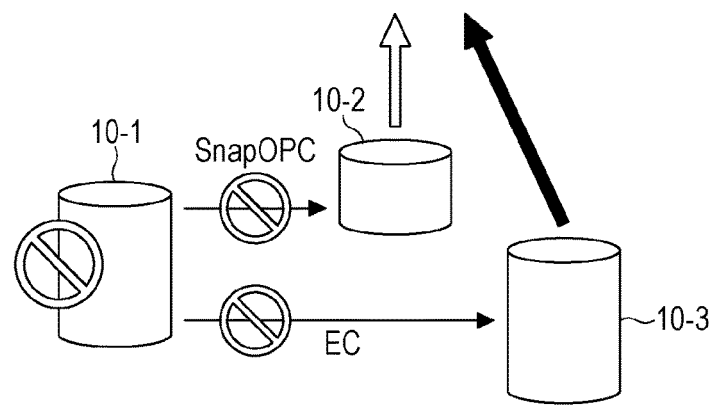
FIG. 6 is a diagram illustrating an example of a process of reading data upon a hardware failure in the storage system according to the embodiment.

FIG. 6 is a diagram illustrating an example of a process of reading data upon a hardware failure in the storage system 1 according to the embodiment.

In the example illustrated in FIG. 6, the hardware failure occurs in the copy source volume 10-1.

In this case, the data reader 14 determines whether or not the data requested by the host device 2 to be read is already copied to the SDV 10-2. If the requested data is already copied to the SDV 10-2, the data reader 14 reads the requested data from the SDV 10-2, as indicated by a white arrow.

On the other hand, if the data requested by the host device 2 to be read is yet to be copied to the SDV 10-2, the session identifying unit 15 searches the session management table 21 for a recovery session of the operation volume 10-1. The session identifying unit 15 identifies an equivalent volume 10-3 from which the requested data is to be read.

In this case, the session identifying unit 15 checks whether or not an EC/REC session is registered in the field of recovery session 216 within the session management table 21 for a region to which data is yet to be copied by a SnapOPC session. If an EC/REC session is registered in the field of recovery session 216 within the session management table 21, the session identifying unit 15 selects, as the equivalent volume 10-3 for recovery of the data, a volume recorded in a copy destination volume 213 of the EC/REC session within the session management table 21.

Then, the data reader 14 reads, from the equivalent volume 10-3 identified by the session identifying unit 15, the data that is yet to be copied to the SDV 10-2, as indicated by a black arrow. That is, if it is not possible to recover backup data from only the SDV 10-2 due to the hardware failure of the copy source volume, the data reader 14 compensates for the lack of data from the equivalent volume 10-3 based on the recovery session selected by the session identifying unit 15.

In the example illustrated in FIG. 6, the equivalent volume 10-3 is generated by EC and exists in the same housing 3 as the operation volume 10-1. As illustrated in an example of FIG. 7 described later, however, it may be considered that an equivalent volume 10-4 is generated by an REC session and arranged in a housing 3 that is different from the housing 3 of the operation volume 10-1.

Figure 7:
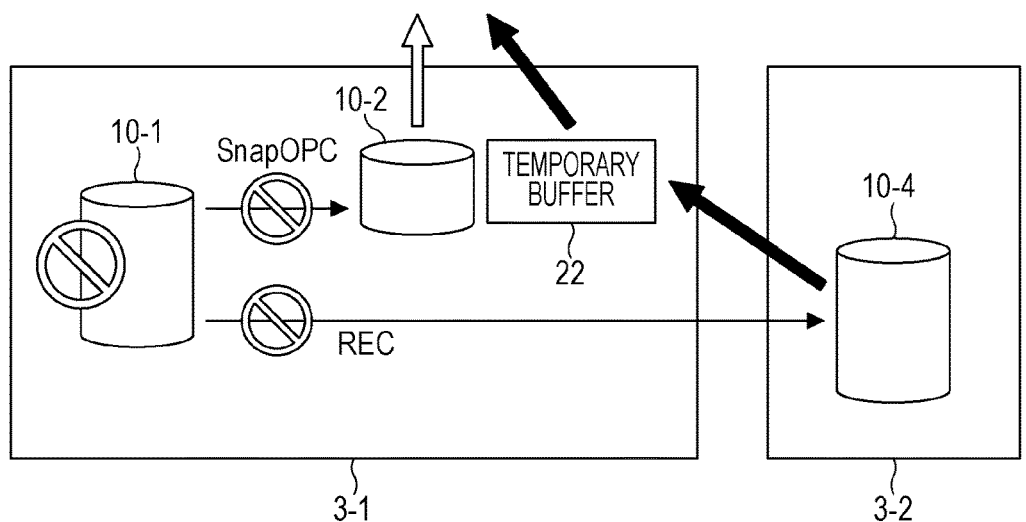
FIG. 7 is a diagram illustrating an example of a process of reading data from an REC equivalent volume upon a hardware failure in the storage system according to the embodiment.

FIG. 7 is a diagram illustrating an example of a process of reading data from an REC equivalent volume 10-4 upon a hardware failure in the storage system 1 according to the embodiment.

In the example illustrated in FIG. 7, the data reader 14 reads requested data, which is yet to be copied to the SDV 10-2, from the equivalent volume 10-4 generated by the REC session identified by the session identifying unit 15, as indicated by two black arrows.

In this case, the data reader 14 reads the requested data from the equivalent volume 10-4 into a temporary buffer 22 (described later) and thereafter reads the requested data from the temporary buffer 22.

The temporary buffer 22 is a storage region to be used for the data reader 14 to store therein temporary data when data recovery is performed between the storage devices 3 (housings). The temporary buffer 22 is secured in the temporary region 26 within the housing of the storage device 3, for example.

A case where multiple equivalent volumes exist may be considered.

Figure 8:
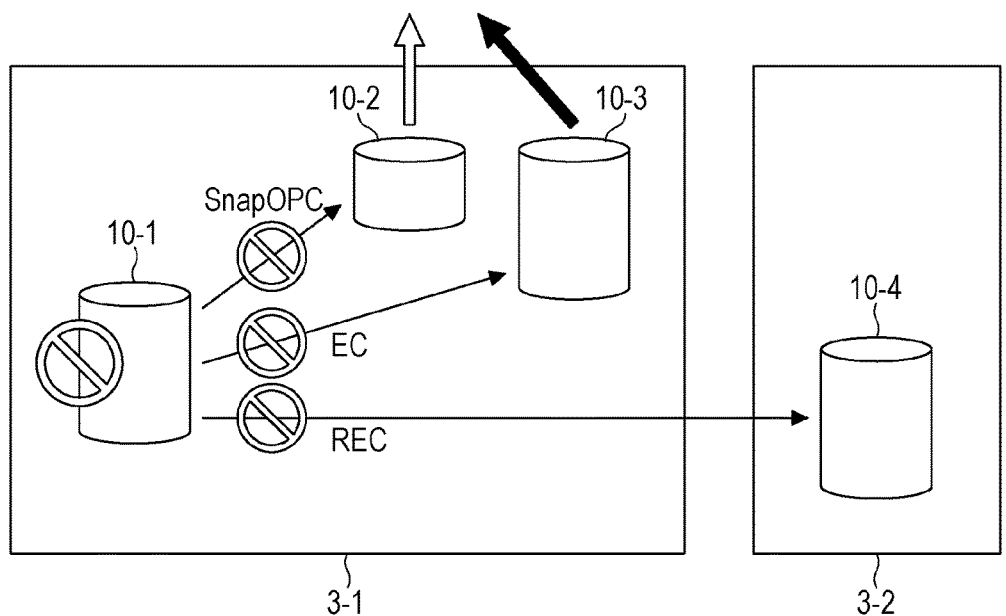
FIG. 8 is a diagram illustrating an example of a process of reading data in a case where multiple candidate equivalent volumes exist when a hardware failure occurs in the storage system according to the embodiment.

FIG. 8 is a diagram illustrating an example of a process of reading data in a case where multiple candidate equivalent volumes exist when a hardware failure occurs in the storage system 1 according to the embodiment.

As illustrated in the example of FIG. 8, if multiple equivalent volumes 10-3 and 10-4 exist, the session identifying unit 15 references the value of the copy type 214 stored in the session management table 21. Then, the session identifying unit 15 selects the equivalent volume 10-3 generated by the EC session while prioritizing the equivalent volume 10-3 over the equivalent volume 10-4 generated by the REC session. The reason is that the data is transferred between the housings 3-1 and 3-2 when the data is read from the equivalent volume 10-4 generated by the REC session and the response time of the storage device 3-1 increases.

In addition, there is a case where an equivalent volume 10-3 or 10-4 generated by a CM 5 (hereinafter referred to as responsible CM 5) responsible for the operation volume 10-1, and an equivalent volume 10-3 or 10-4 generated by a CM 5 (hereinafter referred to as irresponsible CM 5) not responsible for the operation volume 10-1, may exist due to sessions of the same copy type (EC or REC). In this case, the session identifying unit 15 selects the equivalent volume 10-3 generated by the responsible CM 5 on a priority basis.

The reason is that since a cache memory 7 used to read the data exists in the responsible CM 5, the data is transferred between the CMs 5 in order for the responsible CM 5 to read the data from an equivalent volume 10-3 generated by another CM 5 and the response time increases.

The responsible CM 5 of a volume controls the volume, while the irresponsible CM 5 does not control the volume. Since the responsible CM and the irresponsible CM are known to those skilled in the art, and illustration and description thereof are omitted.

If multiple equivalent volumes 10-3 and 10-4 for which copy types and responsible CMs 5 are the same exist, the session identifying unit 15 selects an arbitrary volume from among the candidate equivalent volumes 10-3 and 10-4.

The aforementioned processes performed by the data reader 14 and the session identifying unit 15 are described later with reference to FIG. 10.

A control program for controlling the storage devices 3 that achieves the functions as the copy controller 11, the session performing unit 12, the session associating unit 13, the data reader 14, and the session identifying unit 15 is stored in a computer-readable recording medium such as a flexible disk, a compact disc (CD), for example CD-ROM, CD-R, CD-RW, a digital versatile disc (DVD), for example DVD-ROM, DVD-RAM, DVD-R, DVD+R, DVD-RW, DVD+RW, an HD DVD, a Blu-ray disc, a magnetic disk, an optical disc, or a magneto-optical disc to be provided. A computer reads the program from the recording medium, transfers the program to an internal storage device or an external storage device, stores the program in the internal or external storage device, and executes the program. Alternatively, the program may be stored in a storage device (recording medium) such as a magnetic disk, an optical disc, or a magneto-optical disc and provided to the computer through a communication path from the storage device.

In order to achieve the functions as the copy controller 11, the session performing unit 12, the session associating unit 13, the data reader 14, and the session identifying unit 15, the control program for controlling the storage devices that is stored in an internal storage device (the RAM 27 of the CM 5 or the HDD in the embodiment) is executed by a microprocessor (the CPU 6 of the CM 5 in the embodiment) of the computer. The program stored in the recording medium may be read and executed by the computer.

Figure 9:
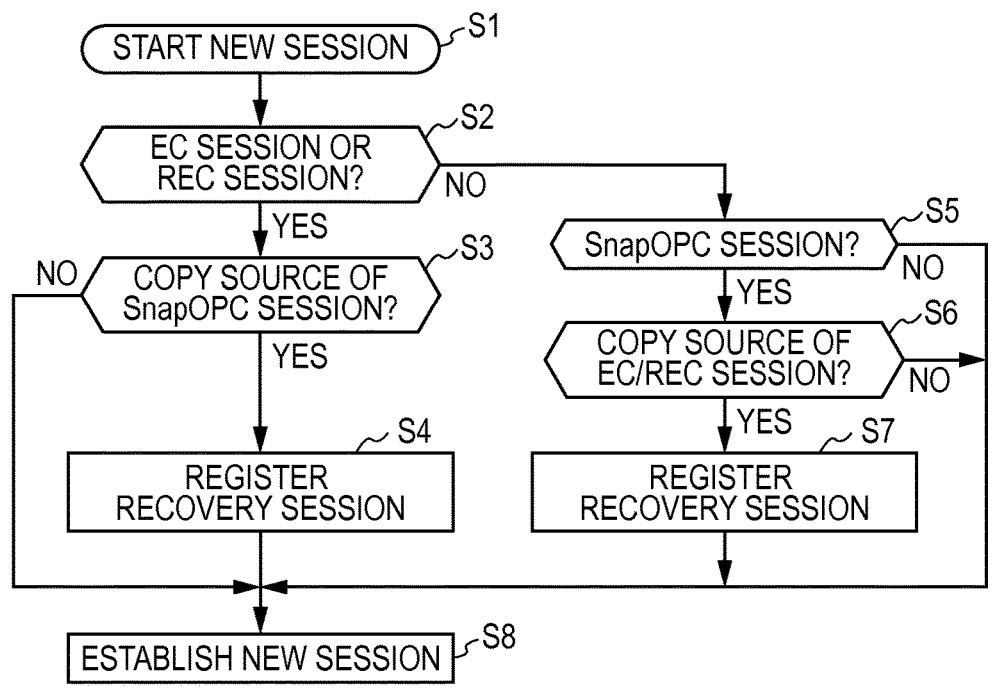
FIG. 9 is a flowchart of a session association process performed by a session associating unit according to the embodiment.
Figure 10:
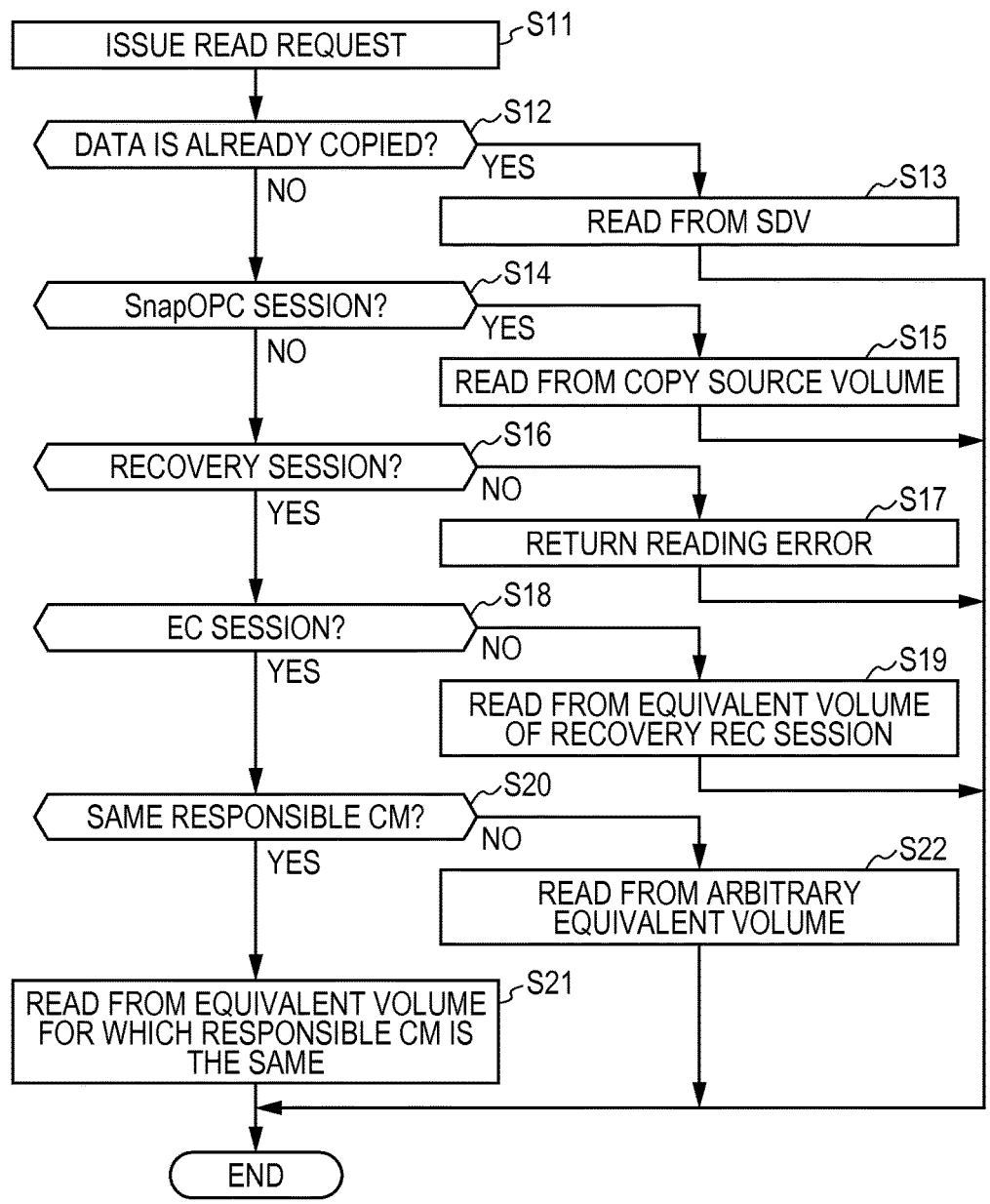
FIG. 10 is a flowchart of a process of reading data from an SDV in the storage system according to the embodiment.

Next, with reference to FIGS. 9 and 10, operations of the storage system 1 according to the embodiment are described.

FIG. 9 is a flowchart of a session association process performed by the session associating unit 13 according to the embodiment.

In S1, the session performing unit 12 of the copy controller 11 receives a request to start a new session.

Next, in S2, the session associating unit 13 of the copy controller 11 determines whether or not the new session requested to be started in S1 is an EC session or an REC session.

If the new session is an EC session or an REC session (YES in S2), in S3, the session associating unit 13 references the session management table 21 and determines whether or not a copy source volume of the new session is the same as a copy source volume of a previously performed SnapOPC session.

If the copy source volume of the new session is not the same as a copy source volume of a previously performed SnapOPC session (NO in S3), in S8, the session performing unit 12 establishes and performs the EC or REC session requested in S1. In this case, the session performing unit 12 registers, in the session management table 21, information on the EC or REC session to be performed.

If the copy source volume of the new session is the same as a copy source volume of a previously performed SnapOPC session (YES in S3), in S4, the session associating unit 13 registers, in the field of recovery session 216 within the session management table 21, the EC or REC session requested in S1 as a recovery session of the SnapOPC session identified in S3. After that, in S8, the session performing unit 12 establishes and performs the EC or REC session requested in S1. In this case, the session performing unit 12 registers the information on the EC or REC session to be performed in the session management table 21.

If the new session is neither an EC session nor an REC session (NO in S2), in S5, the session associating unit 13 determines whether or not the new session requested to be started in S1 is a SnapOPC session.

If the new session is not a SnapOPC session (NO in S5), the session performing unit 12 establishes and performs the requested SnapOPC session in S8. However, since the interested session is not a copy session, the session performing unit 12 does not registers the session in the session management table 21.

If the new session is a SnapOPC session (YES in S5), in S6, the session associating unit 13 references the session management table 21 and determines whether or not the copy source volume of the new session is the same as a copy source volume of a previously performed EC or REC session.

If the copy source volume of the new session is not the same as a copy source volume of a previously performed EC or REC session (NO in S6), in S8, the session performing unit 12 establishes and performs the SnapOPC session requested in S1. In this case, the session performing unit 12 registers information on the SnapOPC session to be performed in the session management table 21.

If the copy source volume of the new session is the same as a copy source volume of a previously performed EC or REC session (YES in S6), in S7, the session associating unit 13 registers the EC or REC session identified in S6 as a recovery session of the SnapOPC session requested in S1 in the field of recovery session 216 within the session management table 21. After that, in S8, the session performing unit 12 establishes and performs the SnapOPC session requested in S1. In this case, the session performing unit 12 registers the information on the SnapOPC session to be performed in the session management table 21.

FIG. 10 is a flowchart of a process of reading data from the SDV in the storage system 1 according to the embodiment.

In S11, the host device 2 issues a request to read data stored in the SDV 10-2 (refer to FIG. 5).

Next, in S12, the data reader 14 references the copy bit map (not illustrated) stored in the CM 5 and determines whether or not the data requested by the host device 2 in S11 is already copied to the SDV 10-2.

If the requested data is already copied to the SDV 10-2 (YES in S12), the data reader 14 reads the requested data from the SDV 10-2 in S13 and terminates the process.

If the requested data is not yet copied to the SDV 10-2 (NO in S12), in S14, the data reader 14 references the session management table 21 and determines whether or not a SnapOPC session that generates the requested SDV 10-2 is active. That is, the data reader 14 determines whether or not the data is able to be read from the copy source volume 10-1 (refer to FIG. 5).

If the data is able to be read from the copy source volume 10-1 (YES in S14), in S15, the data reader 14 reads the requested data from the copy source volume 10-1 and terminates the process.

If the data is not able to be read from the copy source volume 10-1 (NO in S14), in S16, the session identifying unit 15 determines whether or not a recovery session of the SnapOPC session that generates the requested SDV 10-2 is registered in the session management table 21.

If the recovery session is not registered in the session management table 21 (NO in S16), in S17, the data reader 14 returns an error of reading the data to the host device 2 and terminates the process.

If the recovery session is registered in the session management table 21 (YES in S16), in S18, the session identifying unit 15 determines whether or not the registered recovery session is an EC session.

If the recovery session is not an EC session (NO in S18), in S19, the data reader 14 reads the requested data from an equivalent volume 10-4 (refer to FIG. 7) of the recovery REC session and terminates the process.

If the recovery session is an EC session (YES in S18), in S20, the session identifying unit 15 determines whether or not there exists a recovery EC session that includes an equivalent volume 10-3 for which a responsible CM 5 is the same as a responsible CM 5 of the SDV 10-2 from which the data is requested to be read.

If there exists a recovery EC session that includes an equivalent volume 10-3 for which a responsible CM 5 is the same as the responsible CM 5 of the SDV 10-2 from which the data is requested to be read (YES in S20), in S21, the data reader 14 reads the data from the equivalent volume 10-3 which is included in the EC session and the responsible CM 5 for which is the same as the responsible CM 5 of the SDV 10-2. Then, the data reader 14 terminates the process.

If there does not exist a recovery EC session that includes an equivalent volume 10-3 for which a responsible CM 5 is the same as the responsible CM 5 of the SDV 10-2 from which the data is requested to be read (NO in S20), in S22, the data reader 14 reads the requested data from an arbitrary equivalent volume 10-3 of the EC session and terminates the process.

According to the embodiment, every time a SnapOPC session or an EC/REC session is performed, the session associating unit 13 registers an EC/REC session which has a copy source volume that is the same as a copy source volume of the SnapOPC session as a recovery session of the SnapOPC session in the session management table 21.

Thus, even if an abnormality occurs in the operation volume 10-1 and causes a hardware failure, the data reader 14 may read, from equivalent volumes 10-3 and 10-4 of an EC/REC session, data that is not yet copied to the SDV 10-2.

It is, therefore, possible to suppress a disk capacity for data backup and improve the reliability of the storage devices 3.

If an abnormality occurs in the operation volume 10-1, the session identifying unit 15 selects an appropriate equivalent volume on the basis of a copy type of a session and a responsible CM 5.

It is, therefore, possible to return requested data stored in an SDV to the host device 2 while avoiding a significant increase in response time of the storage device 3.

Regardless of the above description, the aforementioned embodiment may be variously modified without departing from the gist of the embodiment.

For example, although the host device 2 is connected to the storage devices 3-1 and 3-2 in the embodiment, different host devices may be connected to each of the storage devices 3-1 and 3-2. A plurality of host devices may be connected to each of the storage devices 3-1 and 3-2.

Although the storage devices 3 each have two CMs 5 in the example illustrated in FIG. 1, the number of CMs included in each of the storage devices 3 may be arbitrarily changed.

Similarly, the number of the CAs 4, the number of the DAs 23, and the number of the disk devices 8 may be arbitrarily changed.

In the embodiment, the CPU 6-1 of the storage device 3-1 executes the control program for controlling the storage devices and thereby functions as the copy controller 11, the session performing unit 12, the session associating unit 13, the data reader 14, and the session identifying unit 15. However, the CPU 6-3 of the storage device 3-2 may execute the control program for controlling the storage devices and thereby function as the copy controller 11, the session performing unit 12, the session associating unit 13, the data reader 14, and the session identifying unit 15. In this case, information of the session management table 21 may be synchronized between the storage devices 3-1 and 3-2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device, comprising:
a memory; and
a processor coupled to the memory and configured to:
copy a part of data stored in a first volume arranged in a first storage device to a second volume when the part of data is modified into another part of data in the first volume,
generate a destination volume whose whole data is identical to whole data of the first volume after the part of data is modified into another part of data in the first volume,
store management information including association information and recovery information, the association information associating the first volume as a copy source with the second volume as a copy destination, the recovery information being related to the destination volume as an equivalent volume of the first volume,
receive a request to read first data, and
read the first data from the second volume when the first data has been copied to the second volume, read the first data from the first volume on basis of the association information when the first data has not been copied to the second volume, and read the first data from the destination volume on basis of the recovery information when the first data has not been copied to the second volume and an abnormality occurs in the first volume.

2. The control device according to claim 1, wherein the processor is configured to
perform a first equivalent copy process of copying the whole data of the first volume to a first destination volume arranged in the first storage device,
perform a second equivalent copy process of copying the whole data of the first volume to a second destination volume arranged in a second storage device different from the first storage device, and
select the first destination volume as the equivalent volume upon failing to read the first data from the first volume.

3. The control device according to claim 1, wherein the processor is configured to
perform a first equivalent copy process of copying the whole data of the first volume to a first destination volume controlled by the control device,
perform a second equivalent copy process of copying the whole data of the first volume to a second destination volume controlled by another control device, and
select the first destination volume as the equivalent volume upon failing to read the first data from the first volume.

4. A method for controlling storage devices, the method comprising:
copying, by a computer, a part of data stored in a first volume arranged in a first storage device to a second volume when the part of data is modified into another part of data in the first volume;
generating a destination volume whose whole data is identical to whole data of the first volume after the part of data is modified into another part of data in the first volume,
storing management information including association information and recovery information, the association information associating the first volume as a copy source with the second volume as a copy destination, the recovery information being related to the destination volume as an equivalent volume of the first volume,
receiving a request to read first data, and
reading the first data from the second volume when the first data has been copied to the second volume, reading the first data from the first volume on basis of the association information when the first data has not been copied to the second volume, and reading the first data from the destination volume on basis of the recovery information when the first data has not been copied to the second volume and an abnormality occurs in the first volume.

5. The method according to claim 4, comprising:
performing a first equivalent copy process of copying the whole data of the first volume to a first destination volume arranged in the first storage device;
performing a second equivalent copy process of copying the whole data of the first volume to a second destination volume arranged in a second storage device different from the first storage device; and
selecting the first destination volume as the equivalent volume upon failing to read the first data from the first volume.

6. The method according to claim 4, comprising:
performing a first equivalent copy process of copying the whole data of the first volume to a first destination volume controlled by the computer;
performing a second equivalent copy process of copying the whole data of the first volume to a second destination volume controlled by another computer; and selecting the first destination volume as the equivalent volume upon failing to read the first data from the first volume.

7. A non-transitory computer-readable recording medium having stored therein a program for causing a computer to execute a method for controlling storage devices, the method comprising:
   copying a part of data stored in a first volume arranged in a first storage device to a second volume when the part of data is modified into another part of data in the first volume;
   generating a destination volume whose whole data is identical to whole data of the first volume after the part of data is modified into another part of data in the first volume,
   storing management information including association information and recovery information, the association information associating the first volume as a copy source with the second volume as a copy destination, the recovery information being related to the destination volume as an equivalent volume of the first volume,
   receiving a request to read first data, and
   reading the first data from the second volume when the first data has been copied to the second volume, reading the first data from the first volume on basis of the association information when the first data has not been copied to the second volume, and reading the first data from the destination volume on basis of the recovery information when the first data has not been copied to the second volume and an abnormality occurs in the first volume.

8. The computer-readable recording medium according to claim 7, the method comprising
   performing a first equivalent copy process of copying the whole data of the first volume to a first destination volume arranged in the first storage device;
   performing a second equivalent copy process of copying the whole data of the first volume to a second destination volume arranged in a second storage device different from the first storage device; and
   selecting the first destination volume as the equivalent volume upon failing to read the first data from the first volume.

9. The computer-readable recording medium according to claim 7, the method comprising
   performing a first equivalent copy process of copying the whole data of the first volume to a first destination volume controlled by the computer;
   performing a second equivalent copy process of copying the whole data of the first volume to a second destination volume controlled by another computer; and
   selecting the first destination volume as the equivalent volume upon failing to read the first data from the first volume.

\* \* \* \* \*